(12) United States Patent
Wong et al.

(10) Patent No.: US 8,984,401 B2
(45) Date of Patent: Mar. 17, 2015

(54) APPARATUS AND METHOD FOR DISPLAYING SUB PAGE CONTENT

(75) Inventors: Shih-Fang Wong, New Taipei (TW); Xin Lu, Shenzhen (CN); Yao-Hua Liu, Shenzhen (CN); Xi Lin, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 335 days.

(21) Appl. No.: 13/459,099

(22) Filed: Apr. 28, 2012

(65) Prior Publication Data

US 2013/0159827 A1 Jun. 20, 2013

(30) Foreign Application Priority Data

Dec. 20, 2011 (CN) .......................... 2011 1 0429401

(51) Int. Cl.
*G06F 17/00* (2006.01)
*G06F 17/30* (2006.01)

(52) U.S. Cl.
CPC ............................... *G06F 17/30905* (2013.01)
USPC .......................................... 715/273; 715/205

(58) Field of Classification Search
CPC .... G06F 17/20; G06F 17/30; G06F 17/30014
USPC ................................................. 715/205, 273
See application file for complete search history.

(56) References Cited

U.S. PATENT DOCUMENTS

| | | | | |
|---|---|---|---|---|
| 5,877,757 A * | 3/1999 | Baldwin et al. | ............... | 715/705 |
| 6,338,059 B1 * | 1/2002 | Fields et al. | .................. | 715/208 |
| 6,697,838 B1 * | 2/2004 | Jakobson | ....................... | 709/203 |
| 6,961,731 B2 * | 11/2005 | Holbrook | .............................. | 1/1 |
| 7,089,487 B2 * | 8/2006 | Tsai | ............................ | 715/208 |
| 7,702,678 B2 * | 4/2010 | Teague | ........................... | 707/722 |
| 7,840,911 B2 * | 11/2010 | Milener et al. | ................ | 715/822 |
| 8,161,369 B2 * | 4/2012 | Bhatt et al. | .................... | 715/202 |
| 8,286,078 B2 * | 10/2012 | Yi | .................................. | 715/273 |
| 2004/0064500 A1 * | 4/2004 | Kolar et al. | .................... | 709/202 |
| 2004/0078451 A1 * | 4/2004 | Dietz et al. | .................... | 709/217 |
| 2007/0256003 A1 * | 11/2007 | Wagoner et al. | ............ | 715/501.1 |
| 2009/0119281 A1 * | 5/2009 | Wang et al. | ........................ | 707/5 |
| 2009/0319544 A1 * | 12/2009 | Griffin et al. | .................. | 707/100 |
| 2012/0117451 A1 * | 5/2012 | You | ................................ | 715/205 |
| 2012/0204087 A1 * | 8/2012 | Yamada | ......................... | 715/205 |

(Continued)

OTHER PUBLICATIONS

Adar et al., Tracking Information Epidemics in Blogspace, IEEE 2005, pp. 1-8.*

*Primary Examiner* — Cong-Lac Huynh
(74) *Attorney, Agent, or Firm* — Novak Druce Connolly Bove + Quigg LLP

(57) ABSTRACT

An apparatus for displaying sub page content includes a display unit, a storage unit, and a processing unit. The apparatus communicates with a network server. The processing unit obtains a webpage from the network server and one or more sub pages linked to the webpage. The display unit displays a first window for displaying label of each sub page designating a type which is binding with each sub page. The processing unit controls the display unit to display a second window for displaying the sub page content of the label displayed on the first window which is determined to be selected according to whether operation position of user's operation performed on the first window is on the area of the label of sub page displayed. A related method is also provided.

20 Claims, 4 Drawing Sheets

(56) References Cited

U.S. PATENT DOCUMENTS

2012/0290910 A1* 11/2012 Kumar et al. ............... 715/205
2012/0290917 A1* 11/2012 Melnyk et al. ............... 715/234
2014/0019846 A1* 1/2014 Gilead et al. ............... 715/234

* cited by examiner

APPARATUS AND METHOD FOR DISPLAYING SUB PAGE CONTENT

BACKGROUND

1. Technical Field

The present disclosure relates to internet technology and, particularly, to an apparatus for displaying sub page content, and a method for displaying sub page content typically employed by the apparatus.

2. Description of the Related Art

When reading webpage content with a browser of an electronic device, such as a personal computer (PC), a display screen of the electronic device may not be large enough to display both a window showing the content of the webpage and a window showing the content of a sub page of the webpage simultaneously. In such case, when the content of the sub page is required to be displayed, a user has to link to the sub page, which is then displayed in a window that takes the place of the window showing the webpage. Thus, it is inconvenient for the user to have to read the content of the webpage and the content of the sub page in different windows viewed alternatively.

BRIEF DESCRIPTION OF THE DRAWINGS

The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
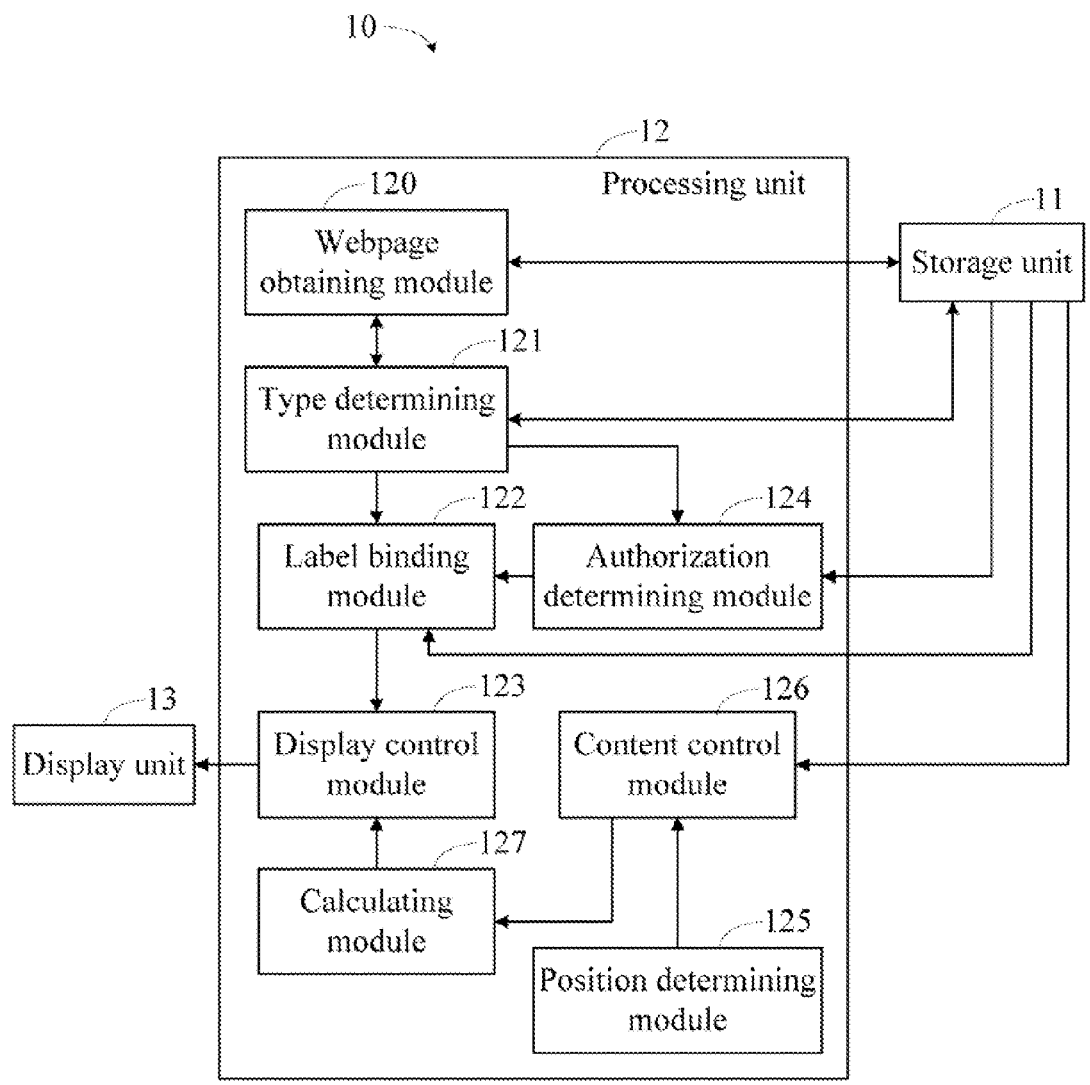
FIG. 1 is a block diagram of an apparatus for displaying sub page content, in accordance with an exemplary embodiment.

FIG. 1 is a block diagram of an apparatus for displaying sub page content. The apparatus 10 includes a storage unit 11, a processing unit 12, and a display unit 13.

The processing unit 12 includes a webpage obtaining module 120, a type determining module 121, a label binding module 122, and a display control module 123. The webpage obtaining module 120 transmits a request to a network server (not shown) to obtain a webpage and one or more sub pages which are linked to the webpage. The storage unit 11 stores the obtained webpage and sub pages. The display control module 123 displays the webpage on a first window 130 (shown in FIG. 2) provided by the display unit 13. The type determining module 121 determines a type of content of each of the sub pages of the webpage, wherein such types include, for example, a video type, a text type, or an image type. In the following description, unless the context indicates otherwise, a reference to a "type of sub page" is a reference to a type of the content of the sub page.

Each type of sub page is designated by a label, and the labels of all the types of sub pages are stored in the storage unit 11. The label binding module 122 obtains the labels of the determined types of sub pages from the storage unit 11, and binds each sub page with the appropriate label. The display control unit 123 displays the label of each sub page in a predetermined position on the first window 130. In the embodiment, the label is the name of the type of sub page, such as "video," "text," or "image," for example. In an alternative embodiment, the label is a number representing the type of sub page.

Figure 2:
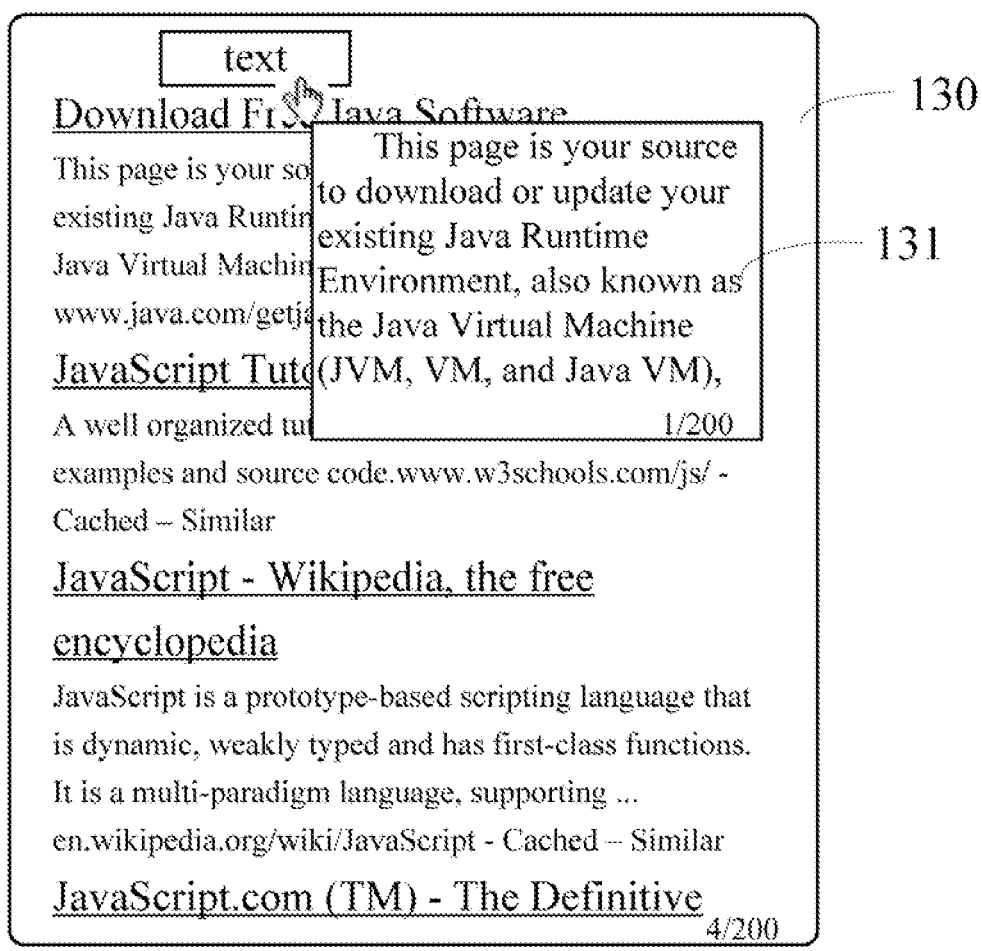
FIG. 2 is a schematic view of a display unit of the apparatus of FIG. 1, the display unit displaying a window showing content of a webpage and a window showing content of a sub page of the webpage, in accordance with an exemplary embodiment.

Referring to FIG. 2, this illustrates the display unit 13 displaying a first window 130 showing content of a webpage and a second window 131 showing content of a sub page of the webpage. In this example, there may be as little as only a single sub page of the webpage. When the webpage obtained from the network server is displayed on the first window 130, if the type determining module 121 determines that the type of sub page is a text type, the label binding module 122 binds the sub page with the label "text," and the display control unit 123 displays the label "text" on the first window 130 of the display unit 13.

In the embodiment, the storage unit 11 is further configured to store a lookup table, which defines relationships between the types of sub pages stored in the storage unit 11 and user information. The lookup table sets out, for each user, each type of sub page that the user is authorized to read (or view). The user information includes user names registered in the apparatus 10. The apparatus 10 further includes an authorization determining module 124. When the type determining module 121 determines the type of sub page stored in the storage unit 11, the authorization determining module 124 determines whether the determined type of sub page is permitted to be displayed on the first window 130 according to input user information of the user and the lookup table stored in the storage unit 11. For example, the lookup table is preset such that a user named "A" is authorized to read sub pages whose type is the text type or the image type. If the type determining module 121 determines that the types of two sub pages of a webpage are the video type and the image type, respectively, the authorization determining module 124 reads the lookup table and determines that the image type sub page is permitted to be displayed on the display unit 13, and that the video type sub page is not permitted to be displayed on the display unit 13. Then the label binding module 122 binds the image type sub page with the label "image," and the display control unit 123 displays the label "image" on the first window 130.

In the embodiment, the display control module 123 further provides a registering/loading interface on the display unit 13, for a user to input a user name before the obtained webpage content is displayed. The processing unit 12 further includes a position determining module 125, a content control module 126, and a calculating module 127. When the display control unit 123 displays the label bound with each sub page on the first window 130, the position determining module 125 determines an operation position of a user's operation performed on the first window 130. For example, the position determining module 130 determines the operation position according to a position on the first window 130 where a cursor hovers. The content control module 126 determines whether the label of any sub page displayed on the first window 130 is selected according to whether the operation position determined by the position determining module 125 is in the area of the label displayed. If the label is selected, the content control module 126 further obtains the content of the selected sub page from the storage unit 11. The calculating module 127 calculates an area of a second window 131 which is needed to display the sub page content according to the sub page content itself and the operation position. The display control module 123 then displays the second window 131 above the first window 130 in the area calculated by the calculating module 127, and displays the sub page content obtained by the content control module 126 on the second window 131. In the embodiment, the part of the content displayed on the first window 130 under the second window 131 is covered and obscured by the second window 131.

In an alternative embodiment, the display control unit 123 displays all the labels of sub pages on the first display window 130 provided by the display unit 13. The authorization determining module 124 determines whether the type of the selected sub page is permitted to be displayed on the second window 131 according to input user information of the user and the lookup table stored in the storage unit 11. For example, if the authorization determining module 124 determines that the image type sub page is permitted to be displayed on the second window 131, and that the video type sub page is not permitted to be displayed on the second window 131, when the label of the image type sub page is selected determined by the content control module 126, the display control module 123 then displays sub page content obtained by the content control module 126 on the second window 131, and when the label of the video type sub page is selected determined by the content control module 126, the display control module 123 remains displaying the first window 130 unchanged.

In the embodiment, when the first window 130 and the second window 131 are both displayed on the display unit 13, the content displayed on the first window 130 and the second window 131 can be operated separately. When the apparatus 10 is operated, the position determining module 125 determines the operation position, and the content control module 126 then determines whether such operation position is on the first window 130 or on the second window 131. If the operation position is on the first window 130, the content control module 126 hides the second window 131, and implements the operation on the first window 130. If the operation position is on the second window 131, the content control module 126 implements the operation on the second window 131.

Figure 3:
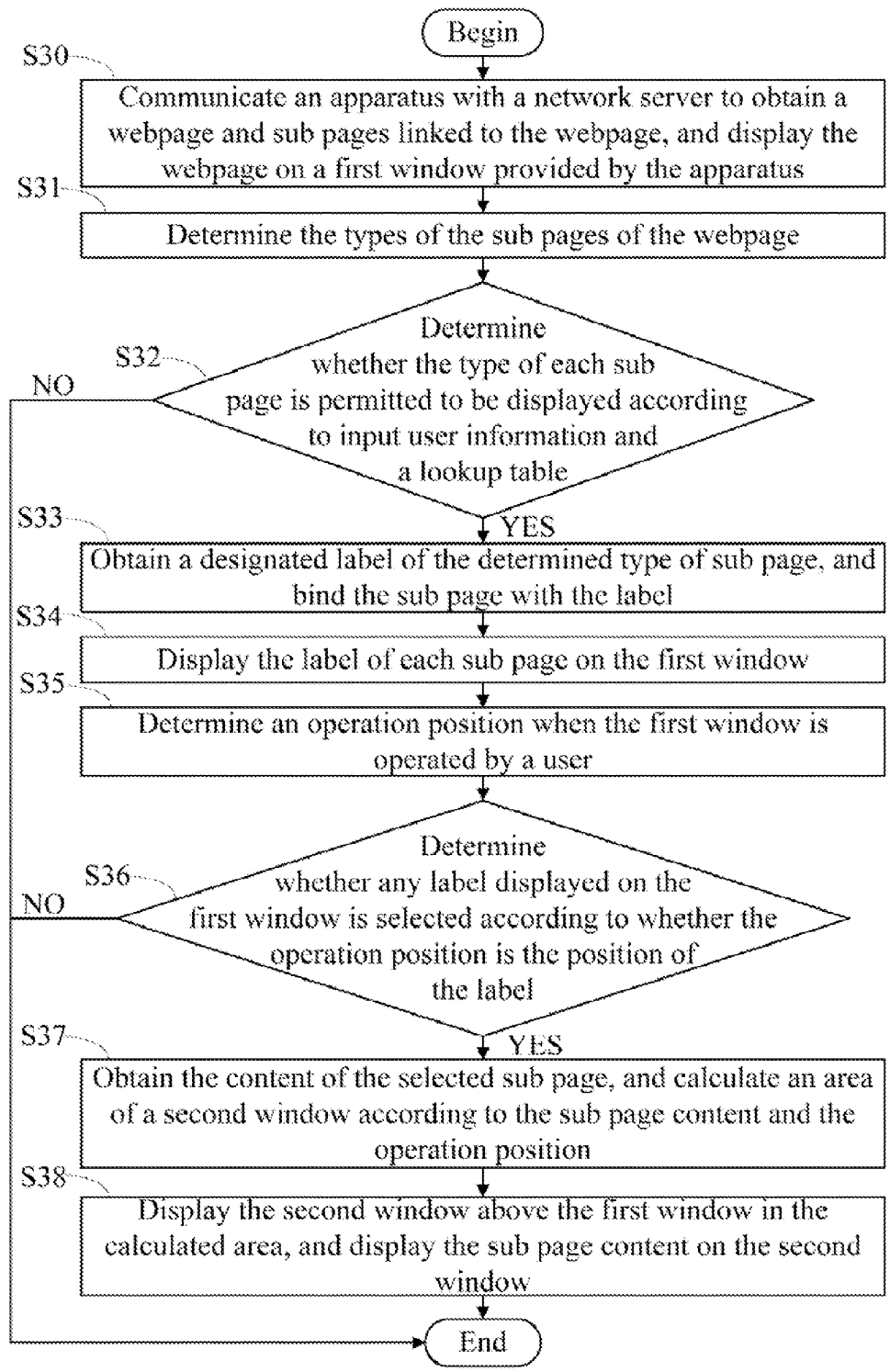
FIG. 3 is a flowchart of a method of displaying sub page content in accordance with an exemplary embodiment, the method applied in the apparatus of FIG. 1.

FIG. 3 is a flowchart illustrating an exemplary method of displaying sub page content, the method applied in the apparatus 10. In the embodiment, the storage unit 11 has a lookup table stored therein in advance. The lookup table defines relationships between the types of sub pages stored in the storage unit 11 and user information. In particular, the lookup table sets out, for each user, each type of sub page that the user is authorized to read (or view). The user information includes user names registered in the apparatus 10.

In step S30, the apparatus 10 communicates with the network server, and the webpage obtaining module 120 transmits a request to the network server to obtain a webpage and sub pages which are linked to the webpage. The storage unit 11 stores the obtained webpage and sub pages. The display control module 123 displays the webpage on the first window 130 provided by the display unit 13.

The display control module 123 provides a registering/loading interface on the display unit 13, for a user to input a user name before the display control module 123 displays the obtained webpage content.

In step S31, the type determining module 121 determines the types of sub pages of the webpage.

The types of sub pages of the webpage include video type, text type, or image type. Each type of sub page is designated by a label, and the labels of all the types of sub pages are stored in the storage unit 11.

In step S32, the authorization determining module 124 determines whether the type of each sub page is permitted to be displayed on the first window 130, according to input user information of the user and the lookup table stored in the storage unit 11. If the determination is yes, the procedure goes to step S33, otherwise, the procedure ends.

In step S33, the label binding module 122 obtains the label of the determined type of sub page from the storage unit 11, and binds the sub page with the label.

In the embodiment, the label is the name of the type of sub page, such as "video," "text," or "image," for example. In an alternative embodiment, the label is a number representing the type of sub page.

In step S34, the display control unit 123 displays the label of each sub page in a predetermined position on the first window 130.

In step S35, the position determining module 125 determines an operation position when the first window 130 is operated by a user.

In step S36, the content control module 126 determines whether the label of any sub page displayed on the first window 130 is selected, according to whether the operation position determined by the position determining module 125 is a position where the label is located. If the determination is yes, the procedure goes to step S37, otherwise, the procedure ends.

In step S37, the content control module 126 obtains the content of the selected sub page from the storage unit 11. The calculating module 127 calculates an area of a second window 131 which is needed to display the sub page content according to the sub page content itself and the operation position.

In step S38, the display control module 123 displays the second window 131 above the first window 130 in the area calculated by the calculating module 127, and displays the sub page content obtained by the content control module 126 on the second window 131.

In the embodiment, the part of the content displayed on the first window 130 under the second window 131 is covered and obscured by the second window 131.

In an alternative embodiment, the display control unit 123 displays all the labels of sub pages on the first display window 130 provided by the display unit 13. The authorization determining module 124 determines whether the type of the selected sub page is permitted to be displayed on the second window 131 according to input user information of the user and the lookup table stored in the storage unit 11. For example, if the authorization determining module 124 determines that the image type sub page is permitted to be displayed on the second window 131, and that the video type sub page is not permitted to be displayed on the second window 131, when the label of the image type sub page is selected determined by the content control module 126, the display control module 123 then displays sub page content obtained by the content control module 126 on the second window 131, and when the label of the label of the video type sub page is selected determined by the content control module 126, the display control module 123 remains displays the first window 130 unchanged.

Figure 4:
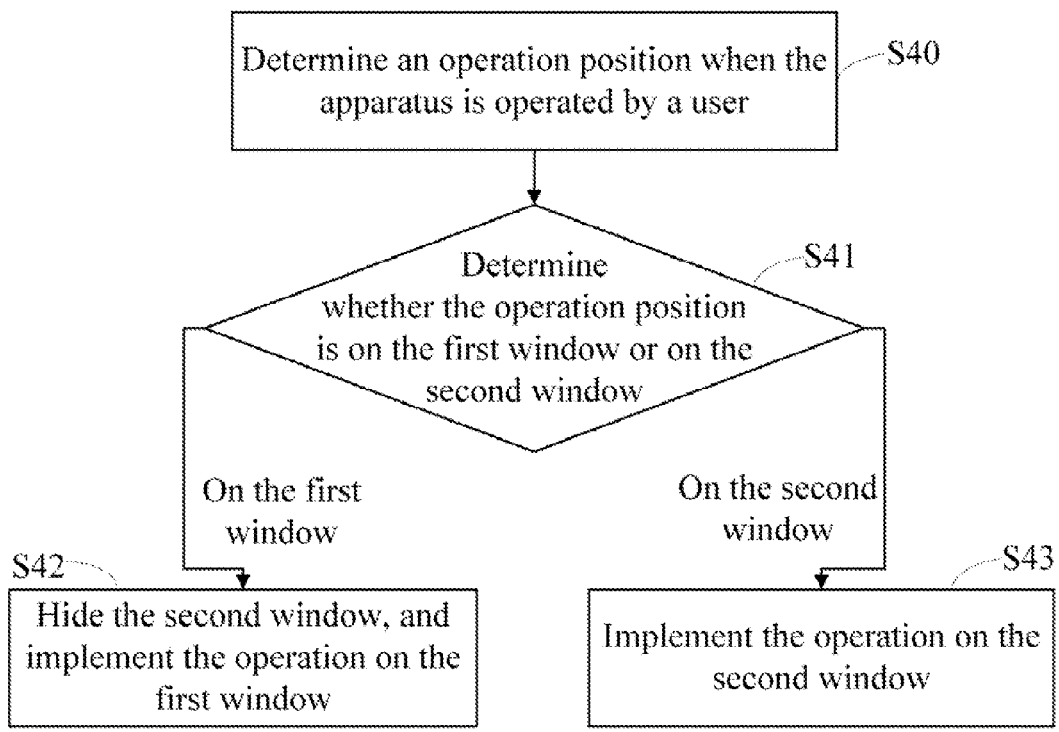
FIG. 4 is a flowchart of a method of operating separately a webpage and a sub page of the webpage in accordance with an exemplary embodiment, the method applied in the apparatus of FIG. 1.

FIG. 4 is a flowchart illustrating an exemplary method of operating separately the displayed webpage and sub page, the method applied in the apparatus 10. When the first window 130 and the second window 131 are both displayed on the display unit 13, the content displayed on the first window 130 and the second window 131 can be operated separately by a user.

In step S40, when the apparatus 10 is operated again by a user, the position determining module 125 determines the operation position.

In step S41, the content control module 126 determines whether such operation position is on the first window 130 or on the second window 131. If the operation position is on the first window 130, the procedure goes to step S42; and if the operation position is on the second window 131, the procedure goes to step S43.

In step S42, the content control module 126 hides the second window 131, and implements the operation on the first window 130.

In step S43, the content control module 126 implements the operation on the second window 131.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An apparatus for displaying sub page content, the apparatus comprising:
    a storage unit;
    a display unit configured for displaying a first window, and for displaying a second window above the first window; and
    a processing unit comprising:
        a webpage obtaining module configured for transmitting a request to a network server communicating with the apparatus to obtain a webpage and one or more sub pages which are linked to the webpage, and storing the obtained webpage and sub pages in the storage unit;
        a display control module configured for displaying the webpage on the first window;
        a type determining module configured for determining a type of content of each of the sub pages of the webpage, respectively, wherein each type of sub page is designated by a label, and the labels of all the types of sub pages are pre-stored in the storage unit;
        a label binding module configured for obtaining the label of each determined type of sub page from the storage unit, and binding each sub page with the corresponding label, wherein the display control unit is further configured for displaying the label of each sub page in a predetermined position on the first window;
        a position determining module configured for determining an operation position of user's operation performed on the first window; and
        a content control module configured for determining when the label, of any sub page displayed on the first window, is selected, the operation position determined by the position determining module is in the area of the displayed label; and further configured for obtaining the content of the selected sub page from the storage unit when the label is selected;
        wherein the display control module is further configured for displaying the obtained sub page content on the second window.

2. The apparatus as recited in claim 1, wherein the storage unit is configured for storing a lookup table defining relationships between the types of sub pages stored in the storage unit and user information, wherein the lookup table sets out each type of sub page that the user is authorized to read.

3. The apparatus as recited in claim 2, wherein the processing unit further comprises an authorization determining module configured for determining whether each determined type of sub page is permitted to be displayed on the first window according to input user information of the user and the lookup table, the label binding module is configured for binding the sub page with the corresponding label only if the determination is yes, and the display control unit displays the obtained webpage on the first window without the label of the sub page if the determination is no.

4. The apparatus as recited in claim 2, wherein the processing unit further comprises an authorization determining module configured for determining whether the type of the selected sub page is permitted to be displayed on the second window according to input user information of the user and the lookup table, the display control module displays the selected sub page content obtained by the content control module on the second window if the determination is yes, and the display control module displays the first window with the label of each sub page if the determination is no.

5. The apparatus as recited in claim 1, wherein the corresponding label is a name of the type of sub page.

6. The apparatus as recited in claim 1, wherein the processing unit further comprises a calculating module configured for calculating an area of the second window to be displayed according to the obtained sub page content itself and the operation position.

7. The apparatus as recited in claim 1, wherein when the first window and the second window are both displayed on the display unit, the position determining module is configured for determining an operation position of a user's further operation, the content control module is configured for determining whether the operation position is on the first window or on the second window, if the operation position is on the first window, the content control module is configured for hiding the second window and implementing the operation on the first window, and if the operation position is on the second window, the content control module is configured for implementing the operation on the second window.

8. A method for displaying sub page content, the method applied in an apparatus, and the method comprising:
    communicating the apparatus with a network server, transmitting a request to the network server to obtain a webpage and one or more sub pages which are linked to the webpage, storing the obtained webpage and sub pages, and displaying the webpage on a first window provided by the apparatus;
    determining a type of content of each of the sub pages of the webpage, respectively, wherein each type of sub page is designated by a label, and the labels of all the types of sub pages are pre-stored in the apparatus;
    obtaining the label of each determined type of sub page, and binding each sub page with the corresponding label;
    displaying the label of each sub page on the first window;
    determining an operation position when the first window is operated by a user;
    determining that when the label, of any sub page displayed on the first window, is selected, the determined operation position is a position where the label of any sub page is located;
    obtaining the content of the selected sub page when the label of any sub page displayed on the first window is determined to be selected; and
    displaying a second window above the first window by the apparatus, and displaying the sub page content on the second window.

9. The method as recited in claim 8, further comprising:
determining an operation position when the apparatus is operated again by a user;
determining whether the operation position is on the first window or on the second window; and
hiding the second window and implementing the operation on the first window if the operation position is on the first window; or
implementing the operation on the second window if the operation position is on the second window.

10. The method as recited in claim 8, further comprising pre-storing in the apparatus a lookup table defining relationships between the types of sub pages and user information, wherein the lookup table sets out each type of sub page that each user is authorized to read or view.

11. The method as recited in claim 10, further comprising, prior to obtaining the label of each determined type of sub page, determining whether the type of each sub page is permitted to be displayed on the first window according to user information of the user and the lookup table; wherein the method proceeds to obtaining the label of the determined type of sub page if the type of the sub page is permitted to be displayed on the first window; or the method ends for the determined type of sub page if the type of the sub page is not permitted to be displayed on the first window.

12. The method as recited in claim 10, further comprising, prior to obtaining the content of the selected sub page, determining whether the type of the selected sub page is permitted to be displayed on the second window according to user information of the user and the lookup table, wherein the method proceeds to obtaining the content of the selected sub page if the type of the selected sub page is permitted to be displayed on the second window; or the method ends for the determined type of the selected sub page if the type of the selected sub page is not permitted to be displayed on the second window.

13. The method as recited in claim 8, further comprising, prior to displaying a second window above the first window by the apparatus, calculating an area of the second window to be displayed according to the obtained sub page content itself and the operation position.

14. The method as recited in claim 8, wherein the corresponding label is a name of the type of sub page.

15. An apparatus for displaying sub page content, the apparatus comprising:
a storage unit;
a display unit; and
a processing unit configured for:
obtaining a webpage from a network server communicating with the apparatus and one or more sub pages which are linked to the webpage, and storing the obtained webpage and sub pages in the storage unit;
determining a type of content of each of the sub pages of the webpage, respectively, wherein each type of sub page is designated by a label, and the labels of all the types of sub pages are stored in the storage unit;
obtaining the label of each determined type of sub page, binding each sub page with the corresponding label, and controlling the display unit to provide a first window for displaying the label of each sub page;
determining that when the label, of any sub page displayed on the first window, is selected, the operation position of a user's operation performed on the first window is in the area of the displayed label; and
obtaining the content of the selected sub page from the storage unit when the label is selected, and controlling the display unit to provide a second window on the first window for displaying the obtained sub page content.

16. The apparatus as recited in claim 15, wherein the storage unit further configured for storing a lookup table defining relationships between the types of sub pages stored in the storage unit and user information, wherein the lookup table sets out each type of sub page that the user is authorized to read.

17. The apparatus as recited in claim 16, wherein the processing unit comprises an authorization determining module configured for determining whether each determined type of sub page is permitted to be displayed on the first window according to input user information of the user and the lookup table, the processing unit is configured for binding the sub page with the corresponding label if the determination is yes, and the processing unit controls the display unit to display the obtained webpage on the first window without the label of the sub page if the determination is no.

18. The apparatus as recited in claim 16, wherein the processing unit comprises an authorization determining module configured for determining whether the type of the selected sub page is permitted to be displayed on the second window according to input user information of the user and the lookup table, the display control module displays the selected sub page content obtained by the content control module on the second window if the determination is yes, and the display control module displays the first window with the label of each sub page if the determination is no.

19. The apparatus as recited in claim 15, wherein the processing unit further comprises a calculating module configured for calculating an area of the second window to be displayed according to the obtained sub page content itself and the operation position.

20. The apparatus as recited in claim 15, wherein when the first window and the second window are both displayed on the display unit, the processing unit is further configured for determining an operation position of a user's further operation, the processing unit is configured for determining whether the operation position is on the first window or on the second window, the processing unit is configured for hiding the second window and implementing the operation on the first window if the operation position is on the first window, and the processing unit is configured for implementing the operation on the second window if the operation position is on the second window.

* * * * *